United States Patent
Nishio et al.

(10) Patent No.: US 6,952,387 B2
(45) Date of Patent: Oct. 4, 2005

(54) OPTICAL DISK PLAYING APPARATUS AND METHOD FOR DISCRIMINATING OPTICAL DISK

(75) Inventors: Yoshimichi Nishio, Kawagoe (JP);
Hitoshi Yamazaki, Kawagoe (JP);
Kazunori Matsuo, Kawagoe (JP);
Takashi Suzuki, Kawagoe (JP);
Yoshihiro Hashizuka, Kawagoe (JP);
Takashi Sasaki, Kawagoe (JP);
Kenichi Takahashi, Kawagoe (JP);
Hiroki Goto, Kawagoe (JP); Hideaki Watarihana, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 476 days.

(21) Appl. No.: 10/114,065

(22) Filed: Apr. 3, 2002

(65) Prior Publication Data

US 2002/0145962 A1 Oct. 10, 2002

(30) Foreign Application Priority Data

Apr. 5, 2001 (JP) .............................. 2001-107154

(51) Int. Cl.[7] .............................................. G11B 5/58
(52) U.S. Cl. .................................. 369/53.23; 369/44.28
(58) Field of Search .......................... 369/44.25, 44.26, 369/44.27, 44.28, 53.22, 53.23, 44.37, 53.2, 369/53.28, 53.37, 53.41, 53.45, 124.02

(56) References Cited

U.S. PATENT DOCUMENTS

| 5,909,419 A | * | 6/1999 | Kamiyama | ................ 369/53.23 |
| 5,995,464 A | * | 11/1999 | Okamoto et al. | ........ 369/53.22 |
| 6,304,535 B1 | * | 10/2001 | Magome et al. | ........... 369/53.2 |

* cited by examiner

Primary Examiner—Paul W. Huber
(74) Attorney, Agent, or Firm—Sughrue Mion, PLLC

(57) ABSTRACT

An optical disk playing apparatus which performs at least a focusing servo operation for reading light as a servo operation and irradiates the reading light onto one optical disk, receives reflected light from the optical disk by a pickup to obtains a light receiving signal, moves an irradiated position of the reading light onto the optical disk to cross tracks on the disk; generates a tracking error signal in response to the reading signal during the track crossing; compares the tracking error signal with a threshold value; and determines the type of the optical disk in accordance with the number of pulses in the compared result signal within a predetermined period from start of the track crossing.

20 Claims, 6 Drawing Sheets

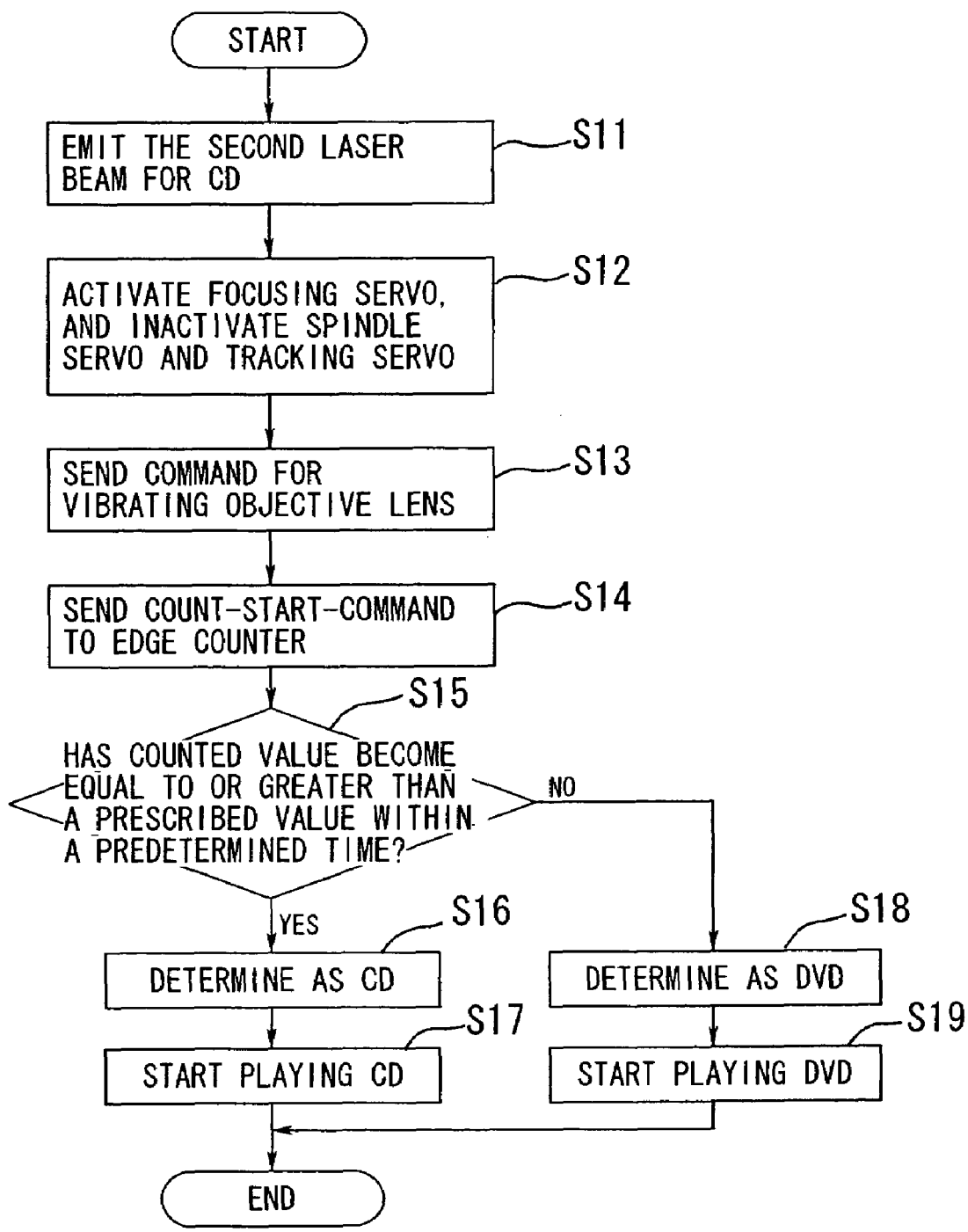

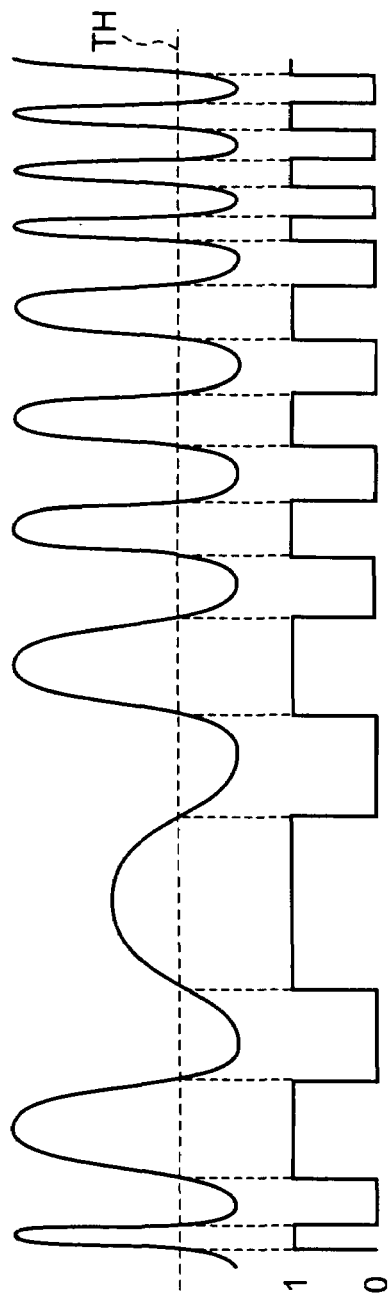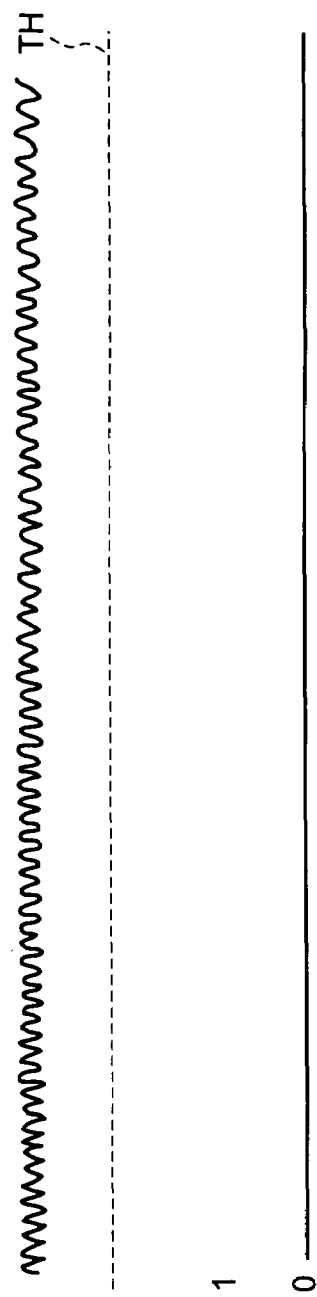

OPTICAL DISK PLAYING APPARATUS AND METHOD FOR DISCRIMINATING OPTICAL DISK

BACKGROUND OF THE INVENTION

1. Field of the Invention

This invention relates to an optical disk playing apparatus for automatically discriminating one optical disk to be either of two types of optical disks which have different recording densities for recoding information so as to play the one optical disk, and a method for discriminating the type of a disk.

2. Description of the Related Art

In a disk playing apparatus capable of playing both optical disks, a CD (compact disk) and a DVD (digital versatile disk), which have different recording densities, when an optical disk is set to the playing apparatus, the playing apparatus discriminates the type of the set disk between a CD and a DVD.

A typical method for discriminating an optical disk in the playing apparatus utilizes a fact that the CD and DVD have different pit lengths formed on their surfaces. Specifically, when the disk is rotated at a prescribed rotation speed, the maximum or minimum pit length is measured from the disk, and the type of the disk is discriminated in size of the pit length. In another method, after the maximum or minimum pit length has been detected, the rotation speed of a spindle motor is controlled such that a time length of the pit becomes constant, and the type of the disk is discriminated from the controlled rotation speed. Further, in a known method, the type of the disk is discriminated by utilizing that a PLL (phase locked loop) circuit is locked when a pit with a predetermined length is read out.

In any method for discriminating the type of the disk by utilizing difference of pit lengths as described above, after a disk has been set to the playing apparatus, the disk must be controlled to be rotated to a predetermined rotation speed such as a prescribed rotation speed. Therefore, there is a problem in that a result of the discrimination of the disk type cannot be necessarily obtained before rotation speed of the disk reaches the predetermined rotation speed. Further, there is another problem in that considerably long time is required for discriminating the type of the disk since control of a tracking servo system and a focusing servo system must be performed progressively to a condition where the tracking and focusing errors are within tolerance so that the pits on the disk are read out by a pickup.

SUMMARY OF THE INVENTION

Therefore, an object of the present invention is to provide an optical disk playing apparatus and a method for discriminating an optical disk, where the type of the optical disk can be discriminated within a comparatively short time.

According to the present invention, there is provided an optical disk playing apparatus for automatically discriminating one optical disk to be either of two types of optical disks which have different recording densities so as to play the one optical disk in accordance with the discriminated result, comprising: a pickup unit for irradiating reading light onto the one optical disk, and receiving reflected light from the one optical disk to output a light receiving signal; a servo device for controlling the pickup unit to perform at least a focusing servo operation for the reading light as a servo operation; a moving device for moving an irradiated position of the reading light by the pickup unit onto the one optical disk to cross tracks which are formed on the one optical disk; a tracking error signal generator for generating a tracking error signal in response to the light receiving signal from the pickup unit during the track crossing of the irradiated position; a binarizing device for comparing the tracking error signal with a threshold value; and a determining device for determining the type of the optical disk in accordance with a number of pulses output from the binarizing device within a predetermined period from start of the track crossing of the irradiated position.

According to the present invention, there is provided a method for discriminating at least two types of optical disks which have different recording densities, the method comprising: performing at least a focusing servo operation for reading light as a servo operation, irradiating the reading light onto one optical disk, receiving reflected light from the one optical disk to obtain a light receiving signal; moving an irradiated position of the reading light onto the optical disk to cross tracks which are formed on the optical disk; generating a tracking error signal in response to the light receiving signal during the track crossing of the irradiated position; comparing the tracking error signal with a threshold value to generate a binarized signal; and determining the type of the one optical disk in accordance with a number of pulses in the binarized signal within a predetermined period from start of the track crossing of the irradiated position.

BRIEF DESCRIPTION OF THE DRAWINGS

FIG. 5 is a flowchart illustrating an operation for discriminating the type of a disk performed by a system control circuit.

FIGS. 6A and 6B show respective waveforms of a tracking error signal and a binarized signal when a disk is a CD.

FIGS. 7A and 7B show respective waveforms of a tracking error signal and a binarized signal when a disk is a DVD.

DETAILED DESCRIPTION OF THE PREFERRED EMBODIMENTS

Hereinafter, preferred embodiments of the present invention will be described in detail with reference to the drawings.

Figure 1:
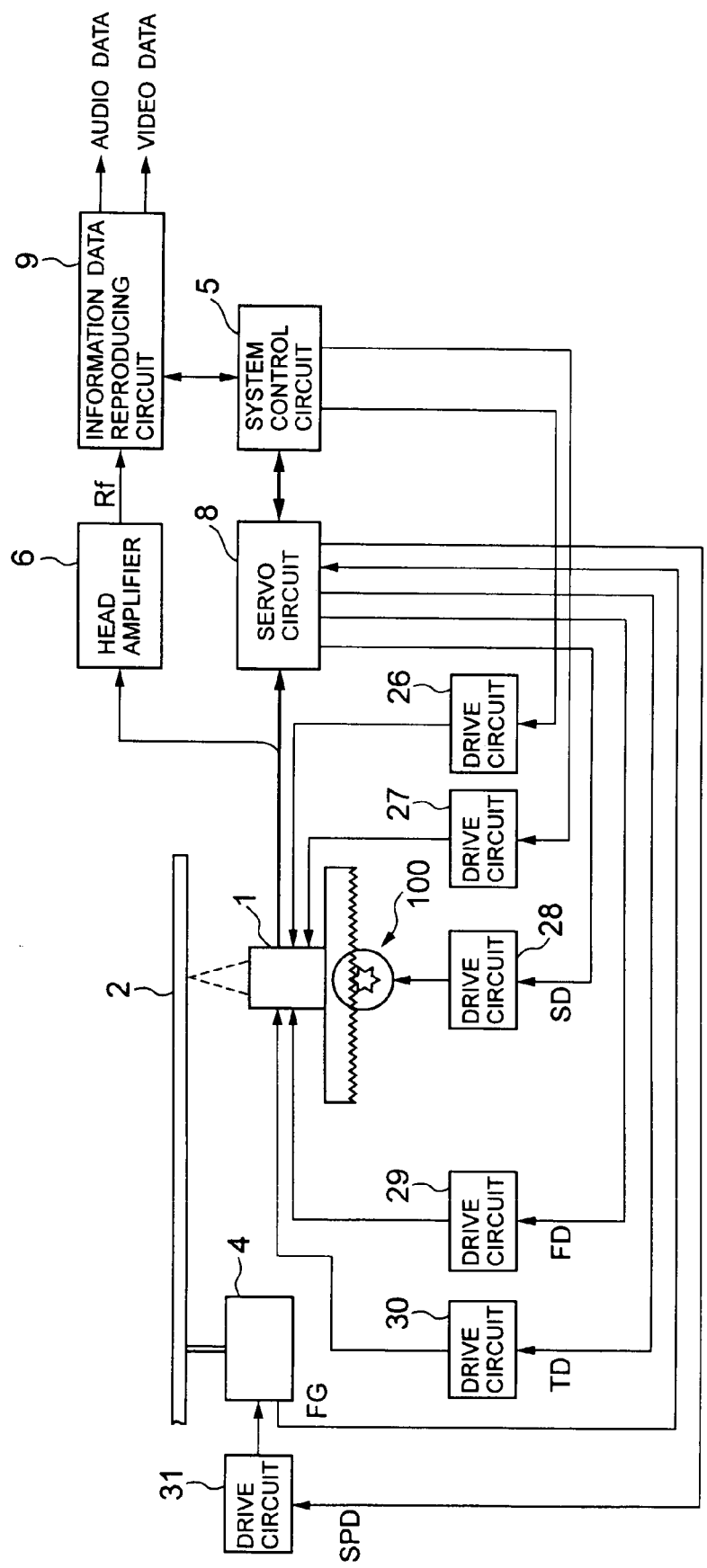
FIG. 1 is a block diagram illustrating an arrangement of an optical disk playing apparatus according to the present invention.

FIG. 1 shows an arrangement of an optical disk playing apparatus to which the present invention is applied. In the playing apparatus, a pickup 1 irradiates laser light onto an optical disk 2, receives reflected light of the laser light from the disk 2, and generates a signal depending on an intensity of the received light. The optical disk 2 is rotationally driven by a spindle motor 4. Either of a CD and a DVD can be used as the optical disk 2. Herein, the term "CD" includes any kind of a CD such as CD-R or CD-ROM, and "DVD" includes any kind of a DVD such as DVD-R or DVD-ROM.

Figure 2:
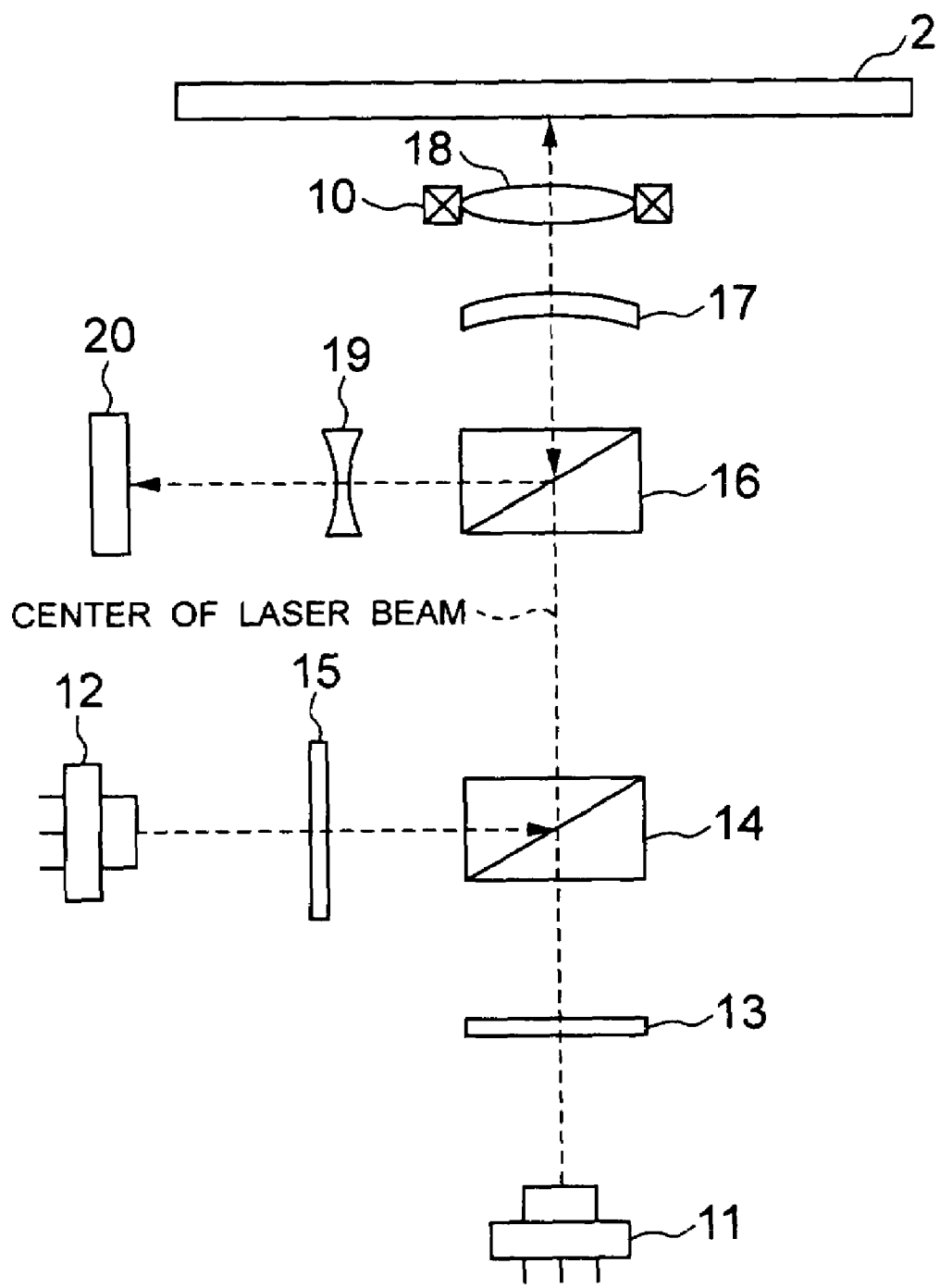
FIG. 2 shows an optical system of a pickup of the playing apparatus shown in FIG. 1.

In an optical system of the pickup 1, as shown in FIG. 2, two semiconductor laser devices 11 and 12 are provided. The first semiconductor laser device 11 emits a first laser beam having a wavelength of 650 nm for a DVD. The second semiconductor laser device 12 emits a second laser beam having a wavelength of 780 nm for a CD. The semiconductor laser devices 11 and 12 are selectively driven by drive circuits 26 and 27 in response to commands from a system control circuit 5 as described later.

The first laser beam emitted from the first semiconductor laser device 11 reaches a prism 14 for combining optical paths through a first grating 13. The first grating 13 is provided for dividing the first laser beam into a plurality of luminous fluxes (zero-order light and ± first-order lights). The zero-order light is a main beam where the incident first laser beam has been passed through the grating directly, and used to perform a focusing servo operation and generate a reading signal. The ± first-order lights are sub beams created due to diffraction of the first laser beam, and used to perform a tracking servo operation with a differential push-pull method together with the zero-order light. The optical path combining prism 14 passes the first laser beam therethrough in the forward direction of the beam.

The second laser beam emitted from the semiconductor laser device 12 reaches the optical path combining prism 14 through a second grating 15. The second grating 15 is provided for dividing the second laser beam into a plurality of luminous fluxes (zero-order light, and ± first-order lights). In the case of the second laser beam similarly as the first laser beam, the zero-order light is a main beam where the incident second laser beam has been passed through the grating directly, and used to perform the focusing servo operation and generate a reading signal. The ± first-order lights are sub beams created due to the diffraction of the second laser beam, and used to perform the tracking servo operation with a differential push-pull method together with the zero-order light. The optical path combining prism 14 reflects the incident second laser beam at substantially right angle to the beam. The forward direction of the reflected laser beam is equal to the forward direction of the first laser beam described above, or the direction of the optical disk 2 as a recording medium.

A beam splitter 16, a collimator lens 17, and an objective lens 18 are arranged between the optical path combining prism 14 and the optical disk 2. The beam splitter 16 passes the laser beam from the optical path combining prism 14 directly toward the optical disk 2.

The collimator lens 17 converts the laser beam from the beam splitter 16 into a parallel light and supplies it to the objective lens 18. The objective lens 18 is a bifocal lens, and converges the laser beam as a parallel light onto a recording surface of the disk 2. The laser beam reflected at the recording surface of the disk 2 is converted into a parallel light by the objective lens 18 and the collimator lens 17, and then reflected by the beam splitter 16. The beam splitter 16 reflects the reflected laser beam at an angle of about 90 degrees to incidence of the beam. A cylindrical lens 19 and a photodetector 20 are arranged in that order in the direction of the laser beam reflected by the splitter 16. The cylindrical lens 19 is an astigmatic generation element for generating astigmatism.

The pickup 1 is further provided with an actuator 10 including a focusing portion for shifting the objective lens 18 in a direction of its optical axis and a tracking portion for shifting the objective lens 18 in a radius direction of the disk perpendicular to the optical axis.

Figure 3:
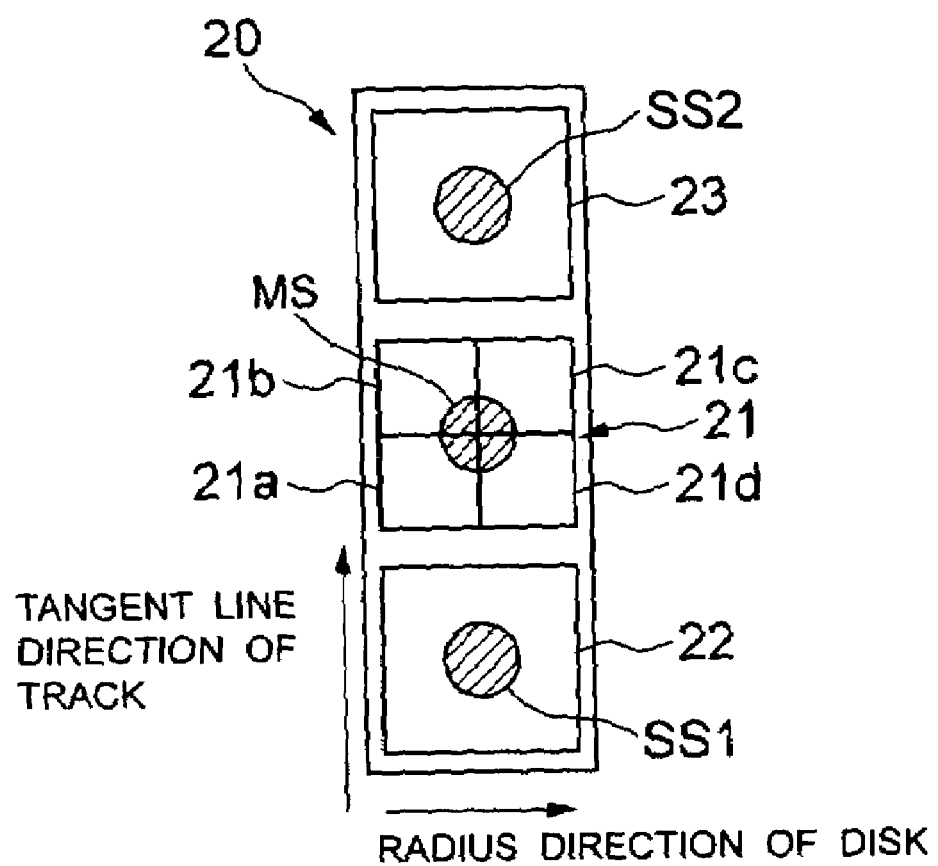
FIG. 3 shows the light receiving surface of a photodetector of the pickup shown in FIG. 2.

The photodetector 20 includes a light receiving unit 21 for receiving the main beam and light receiving units 22 and 23 for receiving the sub beams arranged to sandwich the unit 21 as shown in FIG. 3. The light receiving unit 21 has a four-divided surface for receiving light. Two directions of the four-division are corresponding to the line of the radius of the disk and tangential line of the track, respectively. The light receiving unit 21 includes four light receiving elements 21a–21d corresponding to the respective portions of the four-divided surface.

Output signals from the light receiving units 21–23 are supplied to a head amplifier 6 and a servo circuit 8. The head amplifier 6 obtains an RF (radio frequency) signal in accordance with output signals from the light receiving elements 21a–21d of the light receiving unit 21 as described later, amplifies the signal to be an RF signal Rf, and supplies it to an information data reproducing circuit 9.

The information data reproducing circuit 9 restores data recorded on the optical disk 2 by binarizing the RF signal Rf output from the head amplifier 6 and then performing demodulation and error correction of the binarized signal. Further, the circuit 9 reproduces information data (for example, video, audio, and computer data) by performing information data decode for the restored data, and outputs the data as the reproduced information data.

Figure 4:
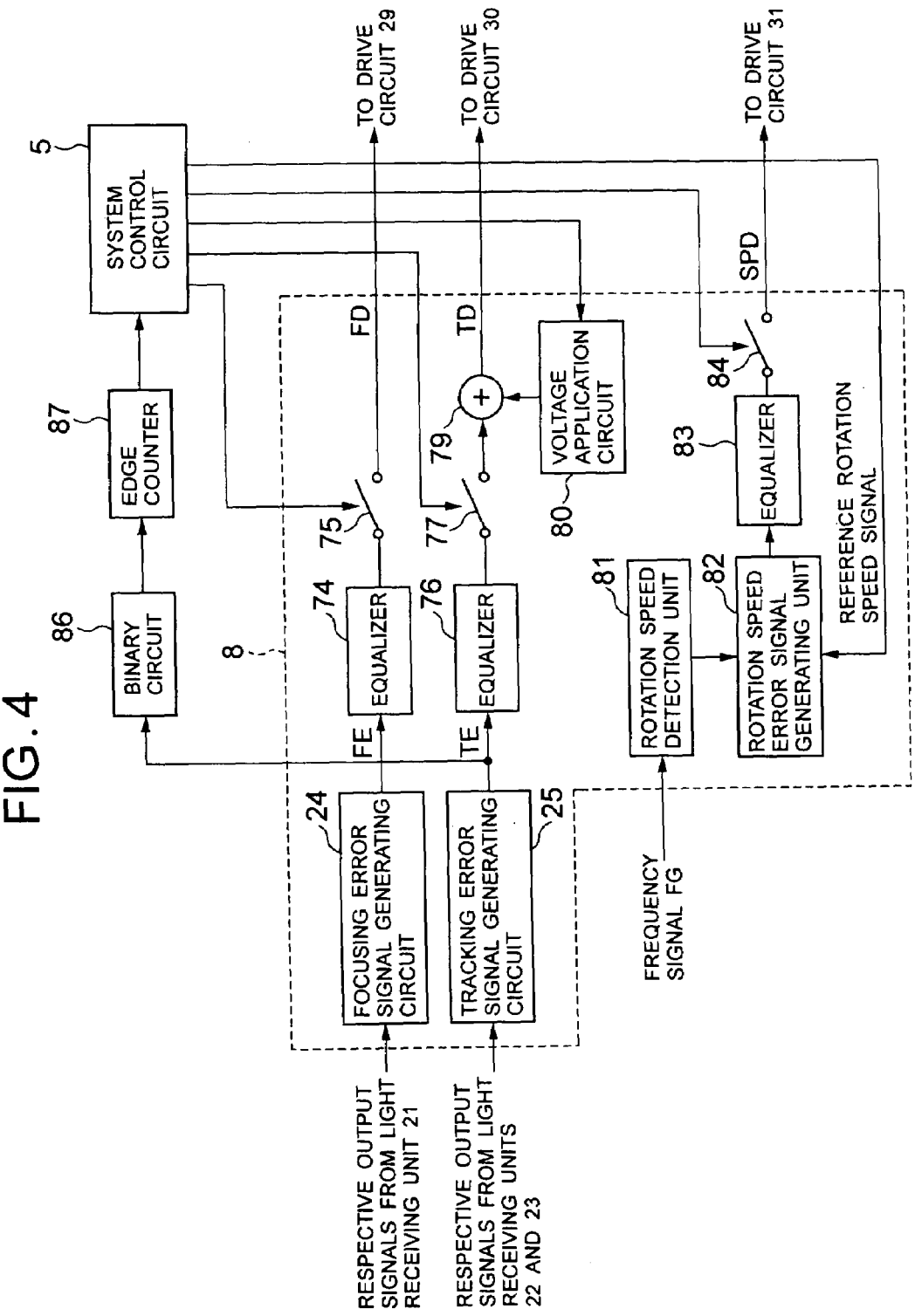
FIG. 4 is a block diagram specifically illustrating a part of the playing apparatus shown in FIG. 1.

The servo circuit 8 has a focusing error signal generating circuit 24 and a tracking error signal generating circuit 25 as shown in FIG. 4. The focusing error signal generating circuit 24 generates a focusing error signal FE indicating focusing error of a beam spot on the recording surface of the optical disk 2 in accordance with respective output signals from the light receiving elements 21a–21d of the light receiving unit 21. The tracking error signal generating circuit 25 generates a tracking error signal TE indicating error of beam spot on the optical disk 2 from the center position of the track in the radius direction of the disk in accordance with the respective output signal from the light receiving units 22 and 23. These error signals are supplied to the servo circuit 8. Also, the tracking error signal generating circuit 25 supplies the tracking error signal TE to a binary circuit 86.

The binary circuit 86 binaraizes the tracking error signal TE. That is, the circuit 86 generates a binarized signal. The binarized signal has a pulse waveform of which a logic level is "1" when a signal level of the tracking error signal TE is equal to or higher than a predetermined level TH, and "0" when it is lower than TH. An output terminal of the binary circuit 86 is connected to an edge counter 87. The edge counter 87 is a counter that counts a front edge of the binarized signal output from the binary circuit 86. The edge counter 87 starts counting in response to a command from the system control circuit 5. The counted value by the edge counter 87 is supplied to the system control circuit 5.

In the servo circuit 8, as shown in FIG. 4, a frequency signal FG as an AC signal indicating a current rotation speed of the spindle motor 4 for rotating the optical disk 2 via a turntable is supplied to a rotation speed detection unit 81. The unit 81 generates a rotation speed signal indicating a rotation speed of a spindle corresponding to the frequency signal FG, and the rotation speed signal is supplied to the system control circuit 5 and a rotation speed error signal generating unit 82. The unit 82 generates a rotation speed error signal indicating a difference between the rotation speed signal and a reference rotation speed signal supplied from the system control circuit 5, and supplies the rotation speed error signal to an equalizer 83. The equalizer 83 generates a spindle drive signal SPD in accordance with the rotation speed error signal, and supplies the spindle drive signal SPD to the spindle motor 4 through a drive circuit 31 when a switch 84 is turned on. The spindle motor 4 rotationally drives the optical disk 2 at a rotation speed corresponding to the spindle drive signal SPD. The spindle motor 4 has an AC generator (not shown) which supplies the frequency signal FG corresponding to the current rotation speed to the servo circuit 8. The spindle servo system can rotationally drive the spindle motor 4 at the rotation speed indicated by the reference rotation speed signal supplied from the system control circuit 5.

In the servo circuit 8, the focusing error signal FE is supplied to an equalizer 74. The equalizer 74 generates a focusing drive signal FD and supplies the focusing drive signal FD to the drive circuit 29 when a switch 75 is turned on. The drive circuit 29 drives the focusing portion of the actuator 10 mounted on the pickup 1 in response to the focusing drive signal FD, and the focusing portion operates to adjust a focal point of the beam spot irradiated onto the disk 2.

Further, in the servo circuit 8, the tracking error signal TE is supplied to an equalizer 76. The equalizer 76 generates a tracking drive signal TD and supplies the tracking drive signal TD to a drive circuit 30 through an adder 79 when a switch 77 is turned on. The drive circuit 30 drives the tracking portion of the actuator 10 mounted on the pickup 1 in response to the tracking driver signal TD, and the tracking portion moves the position of the beam spot irradiated on the disk 2 in the radius direction of the disk by just a distance corresponding to a driving current based on the tracking drive signal TD.

Each of the above switches 75, 77, 84 performs ON-OFF control action in response to the commands from the system control circuit 5. The switch 75 is turned on when the focusing servo is controllably operated, the switch 77 is turned on when the tracking servo is controllably operated, and the switch 84 is turned on when the spindle servo is controllably operated.

Further, while not shown in FIG. 4, the servo circuit 8 generates a slider drive signal SD in response to the tracking error signal TE, and supplies the signal SD to a slider 100 through a drive circuit 28. This causes the slider 100 to shift the pickup 1 in the radius direction of the disk at a rotation speed corresponding to a drive current based on the slider drive signal SD.

The system control circuit 5, including a microcomputer, controls the playing apparatus, and generates various control signals depending on operator inputs from an operation unit (not shown) by user and current working condition of the playing apparatus. The servo circuit 8 performs servo control operations in response to the various control signals generated in the system control circuit 5.

In the above arrangement, when the drive circuit 26 drives the semiconductor laser device 11 in response to a drive command from the system control circuit 5, the first semiconductor laser device 11 emits the first laser beam for a DVD, the first laser beam is divided into a plurality of luminous fluxes (zero-order light and ± first-order lights) by the first grating 13 as described before, and then reaches the collimator lens 17 through the optical path combining prism 14 and the beam splitter 16. On the other hand, when the drive circuit 27 drives the second semiconductor laser device 12 in response to the drive command from the system control circuit 5, the second semiconductor laser device 12 emits the second laser beam for a CD, the second laser beam is divided into a plurality of luminous fluxes (zero-order light and ± first-order lights) by the second grating 15, and then reflected toward the disk 2 by the optical path combining prism 14. The reflected laser beam reaches the collimator lens 17 through the beam splitter 16.

When either of the first or the second laser beam is emitted, the laser beam is collimated by the collimator lens 17 and reaches the objective lens 18. The objective lens 18 focuses the laser beam on the recording surface of the disk 2 and an oval light spot is formed on the recording surface.

The laser beam, after being modulated and reflected by the information data pit on the recording surface of the disk 2, passes through the objective lens 18 and the collimator lens 17 and returns to the beam splitter 16 which diverges the beam from the optical path started from the semiconductor laser device, and enters respective light receiving surfaces of the light receiving units 21–23 of the photodetector 20 through the cylindrical lens 19. The reflected light of zero-order light from the disk 2 reaches the light receiving unit 21, and the reflected lights as ± first-order lights from the disk 2 reach the light receiving units 22 and 23, respectively.

In the photodetector 20, a circular light spot is formed on each of the light receiving surfaces of the light receiving units 21-23. For example, as shown in FIG. 3, a circular light spot MS of the zero-order light in the intersection of defining lines of the light receiving surfaces of the light receiving elements $21a$, $21b$, $21c$, $21d$ is formed in the light receiving unit 21, and circular light spots SS1 and SS2 of the ± first-order lights are formed in the centers of light receiving units 22 and 23, respectively.

An RF signal Rf and a focusing error signal FE are generated in response to respective output signals from the light receiving elements $21a$–$21d$ of the photodetector 20. In addition, a tracking error signal TE is generated in response to respective output signals from the light receiving units 22 and 23. Assuming that respective output signals of the light receiving elements $21a$–$21d$ are referred as Aa–Ad in that order, and respective output signals of the light receiving units 22 and 23 are referred as B and C in that order, the RF signal Rf is given in the head amplifier 6 by:

$$Rf = Aa + Ab + Ac + Ad$$

the focusing error signal FE is given in the focusing error signal generation circuit 24 by:

$$FE = (Aa + Ac) - (Ab + Ad)$$

and the tracking error signal TE is given in the tracking error signal generating circuit 25 by:

$$TE = B - C$$

The focusing error signal FE is supplied to the drive circuit 29 through the equalizer 74 as a focusing drive signal FD when the switch 75 is turned on. The drive circuit 29 shifts the objective lens 18 in the optical axis direction to the focusing portion of the actuator 10 in response to the focusing drive signal FD and adjusts the focal point of the beam spot irradiated onto the disk 2.

The tracking error signal TE is supplied to the drive circuit 30 through the equalizer 76 as a tracking drive signal TD when the switch 77 is turned on. The drive circuit 30 shifts the objective lens 18 in the radius direction of the disk to the tracking portion of the actuator 10 in response to the tracking drive signal TD and deviates the position of the beam spot irradiated onto the disk 2 thereby.

When an optical disk 2 is set on a turntable (not shown) in the playing apparatus, the system control circuit 5 performs the operation for discriminating the type of the disk 2.

In discrimination of the type of the disk, first the system control circuit 5, as shown in FIG. 5, sends an emission drive command to a drive circuit 27 (step S11). When the emission drive command is supplied to the drive circuit 27, the drive circuit 27 supplies a drive current to the second semiconductor laser device 12 in response to the command, causing the second semiconductor laser device 12 to emit the second laser beam for a CD.

The system control circuit 5, after the step S11 has been completed, switches off the spindle servo, switches on the focusing servo, and switches off the tracking servo (step S12). That is, the switch 75 is turned on, and switches 77 and 84 are turned off. Since only the focusing servo control is operated, the focal point of the beam spot by the second laser beam is adjusted on the recording surface of the disk 2.

The system control circuit 5 sends a command for vibrating the objective lens to a voltage application circuit 80 in the servo circuit 8 (step S13), and sends a count-start-command to the edge counter 87 (step S14). The system control circuit 5, after the step S14 has been completed, determines whether the counted value by the edge counter 87 is more than a prescribed value before a predetermined period will elapse (step S15).

The voltage application circuit 80 supplies a vibration drive voltage, varying up and down, to the drive circuit 30 through the adder 79 in response to the command for vibrating the objective lens. This causes the drive circuit 30 to drive the objective lens 18 through the tracking portion of the actuator 10, and shift the objective lens 18 in the radius direction of the disk within its movable range. That is, the irradiated position of the laser beam moves back and forth in the radius direction on the disk 2 and crosses tracks.

In the case where the second laser beam for a CD is emitted, when the disk 2 is a CD, the tracking error signal TE passes through the above predetermined level TH every time the irradiated position of the laser beam crosses a track of the disk 2. Therefore, when the irradiated position of the laser beam moves in the radius direction on the disk 2, the tracking error signal TE crossing the predetermined level TH is generated as shown in FIG. 6A, the binary circuit 86 generates a binarized signal repeatedly showing 0 and 1 as shown in FIG. 6B, and the edge counter 87 counts the front edge of the binarized signal (pulse) in response to the count-start-command generated at step 14. The counted value by the edge counter 87 increases and then exceeds the determined value within the predetermined period.

On the other hand, when the disk 2 is a DVD, the second laser beam for a CD is emitted. Even if the irradiated position of the laser beam crosses a track of the disk 2, the tracking error signal TE varies slightly, and the level of the variation of the tracking error signal TE does not reach the predetermined level TH as shown in FIG. 7A. Therefore, even if the irradiated position of the laser beam moves in the radius direction on the disk 2, the binary circuit 86 outputs a binarized signal showing its level kept 0 as shown in FIG. 7B. Further, even if the edge counter 87 is in operation condition where it counts a front edge of the binarized signal in response to the count-start-command, the counted value by the counter 87 remains an initial value.

When the counted value by the edge counter 87 is discriminated to be equal to or more than the prescribed value at step S15, the system control circuit 5 determines the type of the disk 2 to be a CD (step S16), and starts playing operation for the CD (step S17). On the other hand, when the counted value by the edge counter 87 does not reach the prescribed value, the circuit 5 determines the type of the disk to be a DVD (step S18), and starts playing operation for the DVD (step S19).

When starting the playing operation for a CD, the emission of the second laser beam from the semiconductor laser device 12 and the focusing servo are kept on, the switch 77 is turned on and the tracking servo is switched on thereby, the switch 84 is turned on and the spindle servo is switched on thereby, and thus a slider servo (not shown) is switched on. Moreover, an operation mode of the information data reproduction circuit 9 is set to a reproduction mode of audio data. When starting the playing operation for a DVD, the emission of laser beam is switched to the first laser beam from the semiconductor laser device 11, the focusing servo is kept ON, the switch 77 is turned on and the tracking servo is switched on thereby, the switch 84 is turned on and the spindle servo is switched on thereby, and thus the slider servo (not shown) is switched on. Moreover, the operation mode of the information data reproduction circuit 9 is set to a reproduction mode of both audio and video data.

Although the focusing servo is performed with the astigmatism method and the tracking servo is performed with the three-beam method in the above described embodiments, any other method known in the art can be used without limiting to those. In addition, the methods for playing a CD and a DVD may be different from each other.

Although the objective lens is vibrated in the radius direction of the disk as the motion for crossing the track, the objective lens can be moved only in one way, or the pickup 1 can be moved in the radius direction of the disk with a slider 100.

As described hereinbefore, according to the invention, the type of the optical disk can be discriminated independently of the rotation speed set for the optical disk, or without waiting arrival of the optical disk to the predetermined rotation speed, and the type of the optical disk can be discriminated with the optical disk being not rotated, consequently the type of the disk can be discriminated within a comparatively short time.

This application is based on a Japanese Patent Application No. 2001-107154 which is hereby incorporated by reference.

What is claimed is:

1. An optical disk playing apparatus for automatically discriminating one optical disk to be either of two types of optical disks which have different recording densities so as to play said one optical disk in accordance with the discriminated result, comprising:

a pickup unit for irradiating reading light onto said one optical disk, and receiving reflected light from said one optical disk to output a light receiving signal;

a servo device for controlling said pickup unit to perform at least a focusing servo operation for the reading light as a servo operation;

a moving device for moving an irradiated position of the reading light by said pickup unit onto said one optical disk to cross tracks which are formed on said one optical disk;

a tracking error signal generator for generating a tracking error signal in response to the light receiving signal from said pickup unit during the track crossing of the irradiated position;

a binarizing device for comparing said tracking error signal with a threshold value; and a determining device for determining the type of said optical disk in accordance with a number of pulses output from said binarizing device within a predetermined period from start of the track crossing of the irradiated position.

2. An optical disk playing apparatus according to claim 1, wherein said reading light is light for an optical disk having lower density of said two types of the optical disks.

3. An optical disk playing apparatus according to claim 1, wherein said determining device includes a counter for counting output pulses of said binarizing device within said predetermined period, and determines said one optical disk as the optical disk having lower density of said two types of the optical disks when counted value by said counter is more than a prescribed value, and determines said one optical disk as the other optical disk having higher density of said two types of the optical disks when the counted value by said counter is smaller than said prescribed value.

4. An optical disk playing apparatus according to claim 1, wherein said tracking error signal generator uses the three-beam method.

5. An optical disk playing apparatus according to claim 1, wherein said servo device activates the focusing servo operation and inactivates a spindle servo operation for rotating the one optical disk at a predetermined rotation speed, during the track crossing of the irradiated position.

6. A method for discriminating at least two types of optical disks which have different recording densities, the method comprising:
performing at least a focusing servo operation for reading light as a servo operation, irradiating the reading light onto one optical disk, receiving reflected light from said one optical disk to obtain a light receiving signal;
moving an irradiated position of the reading light onto the optical disk to cross tracks which are formed on the optical disk;
generating a tracking error signal in response to the light receiving signal during the track crossing of the irradiated position;
comparing the tracking error signal with a threshold value to generate a binarized signal; and
determining the type of said one optical disk in accordance with a number of pulses in the binarized signal within a predetermined period from start of the track crossing of the irradiated position.

7. An optical disk playing apparatus for automatically discriminating an optical disk to be one of two types of optical disks which have different recording densities, and to play said optical disk in accordance with the discriminated result, comprising:
a pickup for irradiating reading light onto said optical disk, and for receiving reflected light from said optical disk to output a light receiving signal;
a moving device for moving an irradiated position of the reading light on said optical disk to cross a track formed on said optical disk; and
a circuit for generating a tracking error signal in response to the light receiving signal during the track crossing of the irradiated position, for comparing said tracking error signal with a threshold value to generate a binarized signal, and for determining the type of said optical disk in accordance with a number of pulses output in the binarized signal within a predetermined period from a start of the track crossing of the irradiated position.

8. An optical disk playing apparatus according to claim 7, wherein said reading light is light for an optical disk having a lower density of said two types of optical disks.

9. An optical disk playing apparatus according to claim 7, wherein said circuit determines that said optical disk is the optical disk having a lower density of said two types of optical disks when the number of pulses is more than a prescribed value, and determines that said optical disk is the optical disk having a higher density of said two types of optical disks when the the number of pulses is smaller than said prescribed value.

10. An optical disk playing apparatus according to claim 7, wherein said circuit uses a three-beam method.

11. An optical disk playing apparatus according to claim 7, further comprising a servo for controlling said pickup to perform at least a focusing servo operation for the reading light as a servo operation, wherein said servo device activates the focusing servo operation and inactivates a spindle servo operation for rotating the optical disk at a predetermined rotation speed, during the track crossing of the irradiated position.

12. An optical disk playing apparatus according to claim 7, wherein said moving device is adapted to vary the irradiated position of the reading light to cross a track of the optical disk while the optical disk remains rotationally stationary.

13. An optical disk playing apparatus according to claim 7, wherein the moving device moves the irradiated position of the reading light on said optical disk in a radial direction of the optical disk to cross the track.

14. A method for discriminating types of optical disks which have different recording densities, comprising:
irradiating a reading light onto an optical disk;
receiving reflected light from said optical disk to obtain a light receiving signal;
moving an irradiated position of the reading light on the optical disk to cross a track formed on the optical disk;
generating a tracking error signal in response to the light receiving signal during the track crossing of the irradiated position;
comparing the tracking error signal with a threshold value to generate a binarized signal; and
determining the type of said optical disk in accordance with a number of pulses in the binarized signal within a predetermined period from a start of the track crossing of the irradiated position.

15. A method for discriminating types of optical disks which have different recording densities according to claim 14, wherein said reading light is light for an optical disk having a lower density of said types of optical disks.

16. A method for discriminating types of optical disks which have different recording densities according to claim 14, wherein the determining of the type of said optical disk includes: determining that the optical disk is an optical disk having a lower density of said types of optical disks when the number of pulses is more than a prescribed value; and determining that the optical disk is an optical disk having a higher density of said types of optical disks when the number of pulses is smaller than the prescribed value.

17. A method for discriminating types of optical disks which have different recording densities according to claim 14, wherein a three-beam method is used.

18. A method for discriminating types of optical disks which have different recording densities according to claim 14, further comprising performing at least a focusing servo operation for reading light as a servo operation, wherein the servo operation is performed and the optical disk is stopped from rotating during the moving of the irradiated position of the reading light to cross a track on the optical disk.

19. A method for discriminating types of optical disks which have different recording densities according to claim 14, wherein the moving of the irradiated position of the reading light to cross a track formed on the optical disk is performed while the optical disk remains rotationally stationary.

20. A method for discriminating types of optical disks which have different recording densities according to claim 14, wherein the moving an irradiated position of the reading light is in a radial direction of the optical disk to cross the track.

* * * * *